United States Patent [19]

Kokubu

[11] Patent Number: 4,586,397
[45] Date of Patent: May 6, 1986

[54] STEERING WHEEL DEVICE

[75] Inventor: Sadao Kokubu, Aichi, Japan

[73] Assignee: Kabushiki Kaisha Tokai Rika Denki Seisakush, Aichi, Japan

[21] Appl. No.: 675,411

[22] Filed: Nov. 27, 1984

[30] Foreign Application Priority Data

Dec. 1, 1983 [JP]  Japan ............................ 58-184543[U]

[51] Int. Cl.[4] ............................................. B62D 1/04
[52] U.S. Cl. .................................. 74/492; 74/484 R; 74/552; 200/61.54
[58] Field of Search ................... 74/484 R, 492, 552; 200/61.54; 280/750

[56] References Cited

U.S. PATENT DOCUMENTS 4,485,371 11/1984 Yamada et al. .................. 74/552 X

FOREIGN PATENT DOCUMENTS 49-17167 4/1974 Japan ................................ 74/484 R
57-172845 10/1982 Japan ................................ 200/61.54
57-201736 12/1982 Japan ................................ 200/61.54

Primary Examiner—Allan D. Herrmann
Attorney, Agent, or Firm—Lowe, Price, LaBlanc, Becker & Shur

[57] ABSTRACT

A steering device is disclosed. It has a steering shaft which is designed to rotate together with the steering wheel. A fixed member fixed to the car body is provided to surround the steering shaft. A stationary member is also provided to surround the steering shaft. A rotary member is rotatably supported by the steering wheel for traveling around the periphery of the fixed member. It also has a timing belt wound around the peripheries of the fixed member, stationary member and rotary member for operatively connecting them.

6 Claims, 2 Drawing Figures

STEERING WHEEL DEVICE

BACKGROUND OF THE INVENTION

The present invention relates to a steering wheel device which is used for an automobile and the like, and more particularly to a steering wheel device wherein the steering pad arranged in the central portion of the steering wheel can be held stationary irrespective of the rotation of the steering wheel.

In recent years, the control equipments of automobiles and the like have been developed to be controlled by electric means, and the operating portions therefore have been arranged in the vicinity of the steering wheel so that the driver can handle them with ease. The steering pad can be named as one of such operating portions. Generally, the steering pad is rotated together with the steering wheel. Therefore, in order to arrange the operating portion on the steering pad, it is required to normally hold the steering pad stationary by some means irrespective of the rotation of the steering wheel. Because of the foregoing, various fashions of fixing means for fixing the steering pad are contemplated. However, conventional devices of this type are all complicated in structure and have such disadvantages as high costs and poor performability.

The present invention was accomplished in view of the above background.

SUMMARY OF THE INVENTION

It is therefore a general object of the invention to provide a steering wheel device wherein the steering pad can be held stationary without fail in simple structure.

Another object of the invention is to provide a steering wheel device which can reduce the operating noise when the steering wheel is operated.

To achieve the above object and others, there is essentially provided a steering wheel device comprising a steering shaft; a steering wheel having a rim section operated by a driver to rotate the steering wheel and a hub section to transmit the rotation of the steering wheel to said steering shaft, said steering wheel further having an intermediate section connecting said hub section and rim section; a fixed member fixed to an automobile body and surrounding said steering shaft to support the same such that said fixed member is free from the rotation of the steering shaft; a stationary member provided to surround said steering shaft such that said stationary member is free from the rotation thereof, said stationary member carrying a steering pad thereon, said fixed member and said stationary member being formed with surfaces extending at a coplanar level in parallel with said steering shaft; a rotary member provided in said intermediate section rotatably about an axis extending in parallel with said steering shaft; an endless flexible member passing around said surfaces of the fixed member and the stationary member to provide an integral engagement therebetween, said endless flexible member further passing around said rotary member.

DETAILED DESCRIPTION OF THE EMBODIMENT

Figure 1:
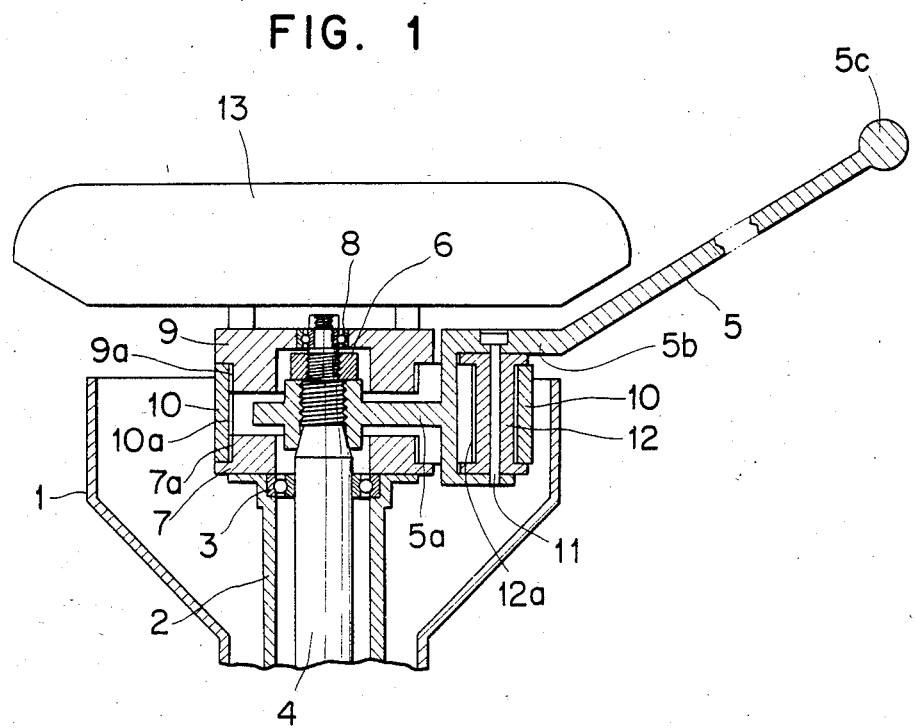
FIG. 1 is a sectional view of a preferred embodiment of the present invention.

FIG. 1 is a sectional view of a preferred embodiment of the present invention. A pipe 2 is fixed to an automobile body and disposed to extend within a column cover 1. A steering shaft 4 in turn extends within said pipe 2 for axial rotation. Said pipe 2 is provided with a bearing 3 to journal said steering shaft 4. A hub section 5a of a steering wheel 5 is fixed to the steering shaft 4 by a nut 6 to transmit the rotation of the steering wheel thereto when a driver operates its rim section 5c. A ring-shaped, fixed member 7 is fixed to one end of said pipe 2. Also, a ring-shaped, stationary member 9 with an identical diameter as that of the fixed member 7 is axially rotatably mounted on the foremost end portion of the steering shaft 4 through a bearing 8 such that said hub section 5a extend between said fixed member 7 and said stationary member 9. Said fixed member 7 and said stationary member 9 are formed at outer peripheries thereof with shouldered portion 7a and 9a to provide surfaces extending at a coplanar level in parallel with said steering shaft respectively. An endless belt 10 passes around said members 7 and 9 such that opposite sides of said endless belt firmly contact said surfaces to provide a unitary structure.

Said steering wheel 5 has an intermediate section 5b between the hub section 5a and the rim section 5c. Within said intermediate section 5b, there is provided a supporting shaft 4 arranged in parallel with the steering shaft. A rotary member 12 is mounted on said supporting shaft 11. Said rotary member 12 is formed at the outer periphery with an engagement portion 12a such as a narrow groove around which the inner periphery 10a of said belt 10 is passed. Said endless member 10 may be of any material which however must be flexible.

Furthermore, a steering pad 13 including the control section for the electric equipments such as switches (not shown) is firmly secured to the upper face of said stationary member 9.

Figure 2:
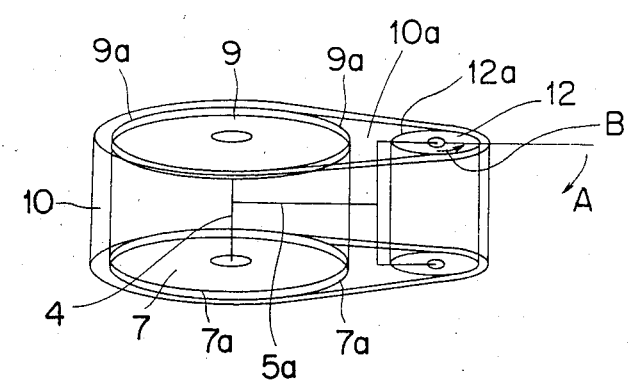
FIG. 2 is a perspective view schematically illustrating the portion which is material to the present invention in order to show the operating principle thereof.

FIG. 2 is a schematic view showing the operating principle among the fixed member 7, stationary member 9, endless belt 10 and rotary member 12 of FIG. 1. In the drawing, when the steering wheel 5 is rotated together with the steering shaft 4 as its rotary shaft, the rotary member 12 mounted on the supporting shaft 11 is also caused to move around the steering shaft 4 in the direction as shown by, for example, an arrow A. At this time, since the fixed member 7 is fixed to the car body by the pipe 2, the rotary member 12 is caused to rotate in the direction as shown by an arrow B with respect to the endless belt 10. On the other hand, since stationary member 9 is connected to the steering shaft 4 through the bearing 8, it is free from the rotation of the steering shaft 4. However, since the member 9 is coupled to the endless belt 10, it will not be rotated due to its integration with the fixed member 7. Consequently, even when the steering wheel 5 and the steering shaft 4 are rotated, the steering pad 13 is normally held in a constant position.

In the above embodiment, an endless belt made of flexible material is employed in order to connect the fixed member, the stationary member and the rotary member.

As described in the foregoing, according to the present invention, the stationary member is coaxially connected to the fixed member. Consequently, even when the steering wheel is rotated, the steering pad will not rotate, thus enabling to operate the operating portion thereof much easily. In addition, since the structure is simple, a favorable assembling performance can be achieved and it can be manufactured at low costs. Moreover, by using flexible resin material or the like as the endless belt, the operating noise generated when the steering wheel is operated can be diminished.

Although the present invention has been described with reference to the preferred embodiment, many modifications and alternations may be made within the sprit of the present invention.

What is claimed is:

1. A steering wheel device of an automobile comprising
   a steering shaft;
   a steering wheel having a rim section operated by a driver to rotate the steering wheel and a hub section to transmit the rotation of the steering wheel to said steering shaft, said steering wheel further having an intermediate section connecting said hub section and rim section;
   a fixed member fixed to an automobile body and surrounding said steering shaft to support the same such that said fixed member is free from the rotation of the steering shaft;
   a stationary member provided to surround said steering shaft such that said stationary member is free from the rotation thereof, said stationary member carrying a steering pad thereon, said fixed member and said stationary member being formed with surfaces extending at a coplanar level in parallel with said steering shaft;
   a rotary member provided in said intermediate section rotatably about an axis extending in parallel with said steering shaft;
   an endless flexible member passing said surfaces of the fixed member and the stationary member to provide a unitary structure therebetween, said endless flexible member further passing around said rotary member.

2. A steering wheel device according to claim 1, further including a pipe fixed to said automobile body, said fixed member being connected to said pipe.

3. A steering wheel device according to claim 2, wherein said pipe is provided with a bearing therewithin to journal said steering shaft.

4. A steering wheel device according to claim 1, wherein said stationary member is provided with a bearing to journal said steering shaft.

5. A steering wheel device according to claim 1, wherein said hub section extending between the fixed member and the stationary member.

6. A steering wheel device according to claim 1, wherein said endless flexible member includes an endless belt.

* * * * *